United States Patent
Piersing et al.

(10) Patent No.: US 9,776,558 B2
(45) Date of Patent: *Oct. 3, 2017

(54) FLASHER VEHICLE INTERFACE MODULE (71) Applicant: Upfitters, L.L.C., Stillwater, OK (US)

(72) Inventors: Amanda Marissa Piersing, Stillwater, OK (US); Roger Bodie Bracken, Stillwater, OK (US)

(73) Assignee: Upfitters, L.L.C., Stillwater, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/864,617

(22) Filed: Sep. 24, 2015

(65) Prior Publication Data
US 2016/0023593 A1   Jan. 28, 2016

Related U.S. Application Data

(63) Continuation of application No. 14/094,835, filed on Dec. 3, 2013, now Pat. No. 9,168,863.

(60) Provisional application No. 61/868,265, filed on Aug. 21, 2013, provisional application No. 61/732,615, filed on Dec. 3, 2012.

(51) Int. Cl.
*B60Q 1/52* (2006.01)
*B60Q 1/46* (2006.01)
*G08B 5/36* (2006.01)

(52) U.S. Cl.
CPC ............. *B60Q 1/46* (2013.01); *G08B 5/36* (2013.01); *B60Q 2900/10* (2013.01); *Y10T 29/49117* (2015.01)

(58) Field of Classification Search
CPC .................................. B60Q 1/46; G08B 5/36
USPC ......................................................... 340/471
See application file for complete search history.

(56) References Cited

U.S. PATENT DOCUMENTS

| | | | | | |
|---|---|---|---|---|---|
| 4,041,383 | A | * | 8/1977 | Howard | G01R 31/023 324/66 |
| 5,389,913 | A | * | 2/1995 | Boser | B60Q 1/46 340/468 |
| 6,005,300 | A | * | 12/1999 | Kelly | B60R 16/0207 307/10.1 |
| 6,426,569 | B1 | * | 7/2002 | Ichikawa | H05B 39/047 307/10.1 |
| 6,630,625 | B1 | * | 10/2003 | Akashi | H01R 43/28 174/71 R |
| 6,928,180 | B2 | * | 8/2005 | Stam | B60Q 1/085 315/82 |
| 9,168,863 | B2 | * | 10/2015 | Piersing | B60Q 1/46 |
| 2006/0132294 | A1 | * | 6/2006 | Spark | B60R 25/1003 340/426.1 |

* cited by examiner

*Primary Examiner* — Kerri McNally
(74) *Attorney, Agent, or Firm* — Martin S. High, P.C.

(57) ABSTRACT

A flasher interface module for a vehicle having factory or original equipment manufacturer (OEM) lights. The flasher interface module includes a plurality of input and output ports corresponding to the factory lights of the vehicle and a plurality of leads corresponding to each of the input and output ports. The flasher interface module is configured such that the input and output ports operate independently of the vehicle such that factory lights are independently controlled by the module.

14 Claims, 11 Drawing Sheets

FLASHER VEHICLE INTERFACE MODULE

CROSS-REFERENCE TO RELATED APPLICATIONS

This application is a continuation of U.S. Non-Provisional patent application Ser. No. 14/094,835, filed on Dec. 3, 2013. U.S. Non-Provisional patent application Ser. No. 14/094,835 in turn claims the benefit of U.S. Provisional Patent Application Ser. No. 61/732,615, filed on Dec. 3, 2012 and U.S. Provisional Patent Application Ser. No. 61/868,265, filed on Aug. 21, 2013. U.S. Non-Provisional patent application Ser. No. 14/094,835, U.S. Provisional Patent Application Ser. No. 61/732,615, and U.S. Provisional Patent Application Ser. No. 61/868,265 are incorporated herein by reference.

TECHNICAL FIELD

This disclosure relates to lighting for vehicles and, more particularly, to a flasher vehicle interface module that functions independently of the vehicle's controller area net work (CAN) electrical system and other body control modules (BCM's) for providing emergency and warning lighting by flashing different selectable lighting patterns via the vehicle's factory headlights and tail lights as well as powering additional after-market and accessory lighting through the module.

BACKGROUND

It is well known to use visual light signals on law enforcement vehicles, emergency vehicles, tow trucks and the like for increasing the visibility of these vehicles to motorists and pedestrians in emergency and traffic control situations. For example, the original equipment manufacturer (OEM) or factory lights on the front and rear of certain law enforcement and emergency vehicles (installed by the vehicle manufacturer) may be programmed to display a number of different emergency signals in a variety of different patterns and colors, i.e., intermittent flashing at various time intervals.

Alternatively, it is also well known to install "aftermarket" lighting systems such as light bars to the vehicle to provide different emergency signals and color patterns. Light bars may be mounted to the exterior roof or top of the emergency or law enforcement vehicles and/or within the interior of these vehicles such that they are visible through the front, side or rear windows. For instance, a representative light bar is disclosed in U.S. Pat. No. 8,325,029, entitled "Multiple Color Multi-Functional Light Bar," issued Dec. 4, 2012. The disclosure of this U.S. patent is incorporated by reference herein.

Generally, light bars may be illuminated by utilizing light sources, such as a plurality of light emitting diodes (LEDs) or halogen lamps to produce different light signals. These light signals may include different colors and/or illumination patterns. The variety of light signals, colors and patterns are useful for generating different visual displays depending on the particular traffic control or emergency situation. As a result, motorists or pedestrians approaching these vehicles may easily view the light display and understand the particular traffic control or emergency situation based upon the signal, color or pattern being displayed.

It is well known that most new vehicles are controlled by a series of body control modules (BCM's) linked to a controller area network ("CAN") electrical or BUS system. CAN electrical systems began to appear in most new vehicles in the early 2000s and now virtually all passenger vehicles sold in the United States are equipped with CAN electrical systems. The CAN electrical system allows various modules and systems within the vehicle to share data and interact. In more detail, the CAN system is a communication standard that allows the various modules and computers in a vehicle to communicate with one another via a common data bus circuit in the wiring system. Namely, the powertrain control module (PCM), anti-lock brake system, electronic steering and suspension, automatic climate control system, keyless entry system, lighting control modules and other systems are interconnected electronically through the CAN system. In turn, the CAN system is linked to a central computer or main BCM within the vehicle.

The most common way to connect a light bar or other after-market illumination system to a vehicle or to program the existing lighting system installed by the OEM vehicle manufacture to display emergency signals is to connect with the harness emanating from one of the individual BCM's, which typically requires manipulation of the wires from the harness, which is not only time-consuming but risks damage to the individual BCM's. For example, this can lead to problems with the specific module and may even shut down the main BCM for the vehicle. As a result, the BCM must be replaced, which is expensive and time-consuming.

If the after-market illumination system is not connected properly, a number of issues may arise, such as phantom lights may appear, the vehicle returns to its factory default settings, the air conditioning, radio and other warning lights may appear. Furthermore, the emergency lighting may not work with the exterior lighting of vehicle, i.e., the emergency vehicle lighting will not function at night when the vehicle's headlights are on or the brake or turn signals lighting are not visible if the emergency lighting is activated, which is clearly problematic.

In order to avoid problems associated with connecting with the OEM harness/factory wires emanating from one of the individual BCM's while installing or programming aftermarket lighting equipment to the vehicle, it is possible to run separate power from the battery or power distribution block to each piece of equipment that needs to be installed. However, this is a tedious process, which requires connecting each piece of additional equipment to the battery or power distribution block. Notwithstanding the time-consuming nature of this process, it does not allow one to tap into power anywhere in the OEM harness, such as headlights or taillights without creating similar problems to the ones mentioned above. Moreover, in certain manufacturer's model vehicles, it not possible to operate a flashing sequence for the headlights while holding the high beam shutters open or disengage the flashing sequence when the driver applies the brakes or turn signals.

Accordingly, there is a need for a flasher vehicle interface module that operates factory lighting systems installed by the OEM as well auxiliary after-market lighting systems. Namely, the flasher vehicle interface module should be isolated from (or bypass) the primary CAN electrical system for the vehicle as well as any individual BCM's to allow the after-market emergency flash lighting systems to easily connect to the vehicle and to operate in an efficient manner without impacting other standard lighting and other electrical operating systems of the vehicle. Furthermore, the flasher vehicle interface module should allow the high beam shutters to be held open so the OEM headlights may be flashed in high beam as well as having an override function that disengages the flashing sequence when the driver applies the brakes or turn signals.

SUMMARY

In accordance with one aspect of this disclosure, a flasher interface module for a vehicle having factory lights is provided. The flasher interface module includes a plurality of input and output ports corresponding to the factory lights of the vehicle and a plurality of leads corresponding to each of the input and output ports. The input and output ports of the module operate independently of the vehicle such that factory lights are controlled by the module.

In one embodiment, the flasher interface module may include a housing having a base and a cover removably connected to the base. The module may be capable of operating the factory lights in multiple different flash patterns. In other embodiments, each of the plurality of leads may be a different color or labeled with a different number. Furthermore, each of the plurality of input ports corresponds equally to each of the plurality of output ports. The module may further have an auxiliary circuit for powering an after-market lighting system installed in the vehicle. In various other embodiments, the module may have an override feature that automatically shuts off the module when a high beam light on the vehicle is activated, when a brake light on the vehicle is activated or when a turn signal light on the vehicle is activated.

Another related aspect of the disclosure is an improvement in a vehicle having a CAN system, a plurality of body control modules and a factory lighting system including headlights, tail lights and brake lights. Specifically, the improvement is an interface module for operating the factory lighting system independently of the CAN system and each of the plurality of body control modules. The interface module may include an auxiliary circuit for supplying power to an after-market light system installed on the vehicle independently of the CAN system and each of the plurality of body control modules. The interface module may also include a housing, a plurality of input ports and output ports, a plurality of leads for connecting the plurality of input and output ports to the factory lighting system of the vehicle and a controller for receiving power. Finally, the interface module may be configured to flash the headlights in high beam mode.

A further aspect of the disclosure is a method of installing a flasher interface module in a vehicle having factory lights to operate the factory lights independent of a CAN system and a plurality of body control modules. The method includes: (1) unplugging a plug for the factory lights from the vehicle on both sides of the vehicle; (2) inserting a female plug from the module into the factory lights on both sides of the vehicle; (3) inserting a male plug from the module into the factory lights plug on both sides of the vehicle; (4) connecting the module to a proper body ground; and (5) connecting a control wire from the module to a controller. The method may further include the steps of configuring the module to operate an after-market lighting system for the vehicle and installing a second flasher interface module in the vehicle.

DETAILED DESCRIPTION OF THE PREFERRED EMBODIMENTS

In the following detailed description, reference is made to the accompanying drawings that form a part hereof, and in which is shown by way of illustration, specific embodiments in which the invention may be practiced. These embodiments are described in sufficient detail to enable those skilled in the art to practice the embodiments and like numerals represent like details in the various figures. Also, it is to be understood that other embodiments may be utilized and that process or other changes may be made without departing from the scope of the disclosure. The following detailed description is not to be taken in a limiting sense, and the scope of the disclosure is defined only by the appended claims and their equivalents. In accordance with the disclosure, a flasher vehicle interface module 100 is hereinafter described.

Figure 1A:
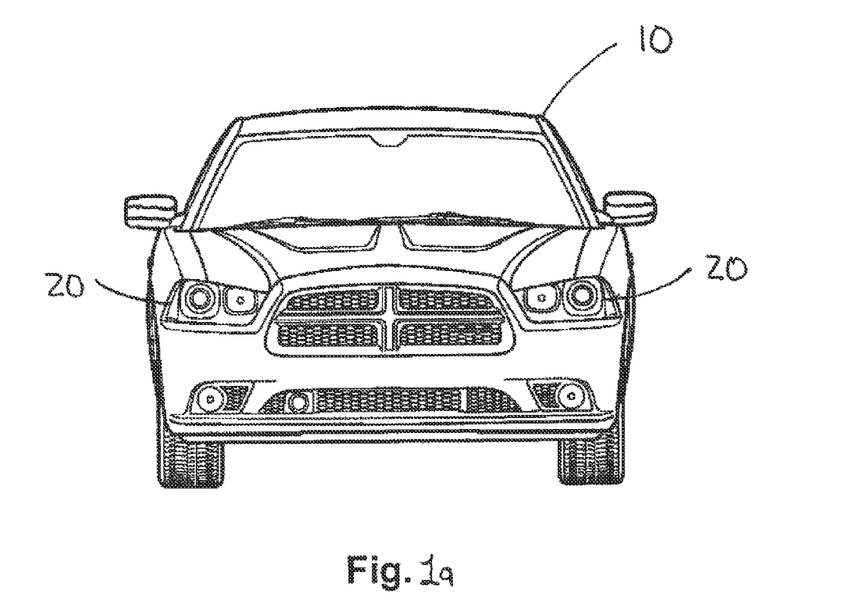
FIGS. 1a and 1b are front and rear views of a representative vehicle for which a flasher vehicle interface module forming one aspect of this disclosure may be incorporated.
Figure 1B:
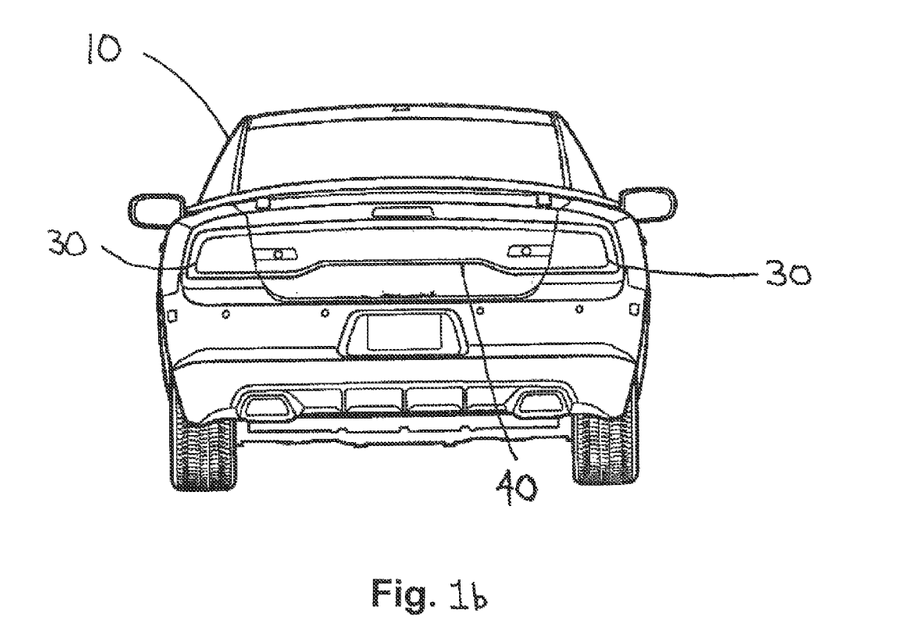
Figure 2A:
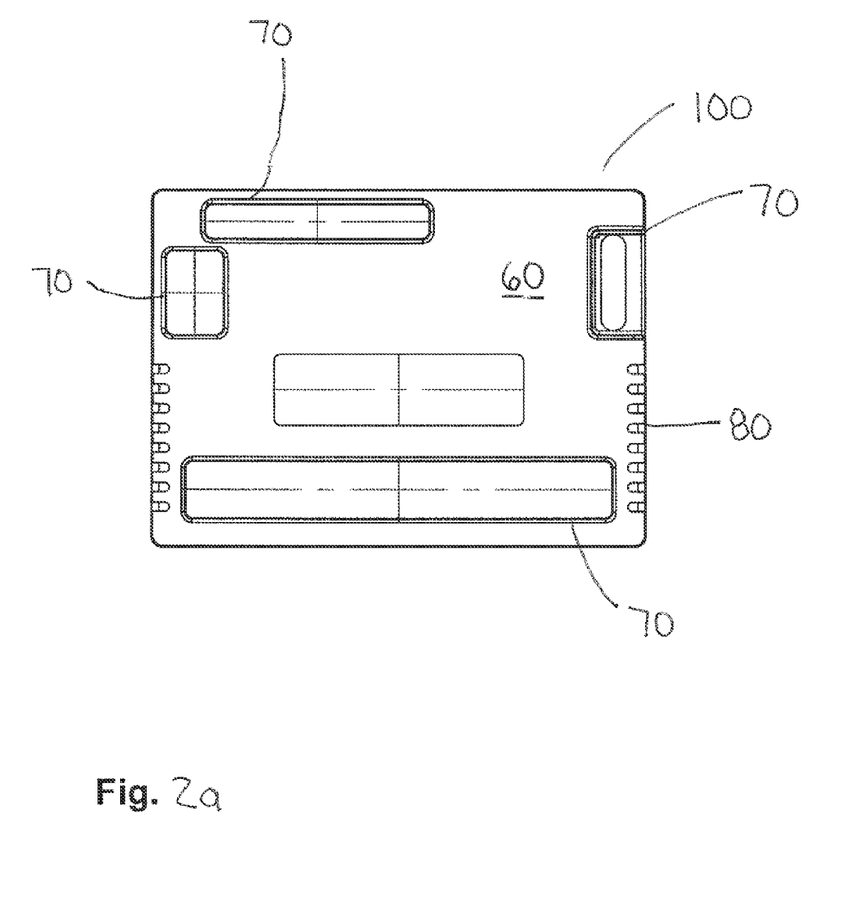
FIGS. 2a-2d are various views of the headlight flasher vehicle interface module forming one aspect of this disclosure.
Figure 2B:
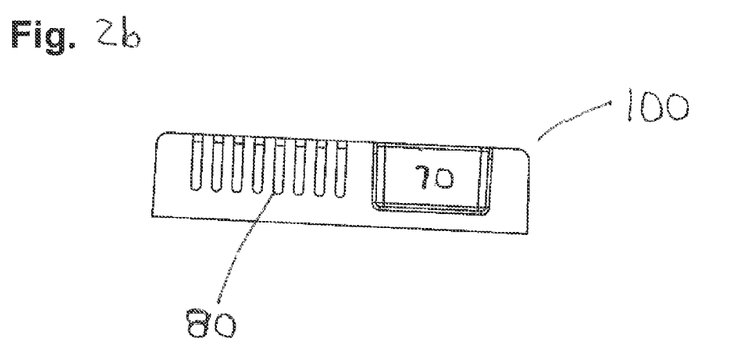
Figure 2C:
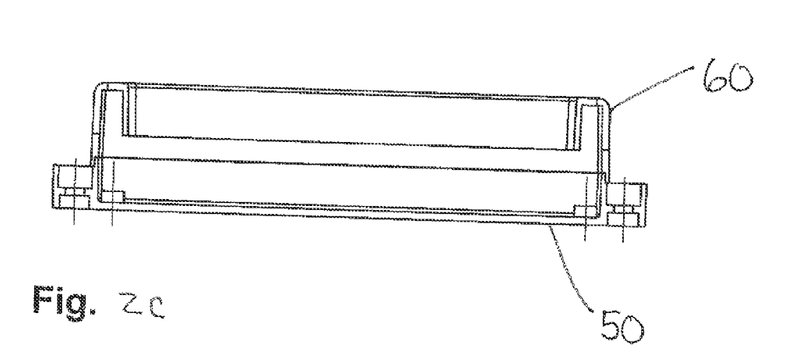
Figure 2D:
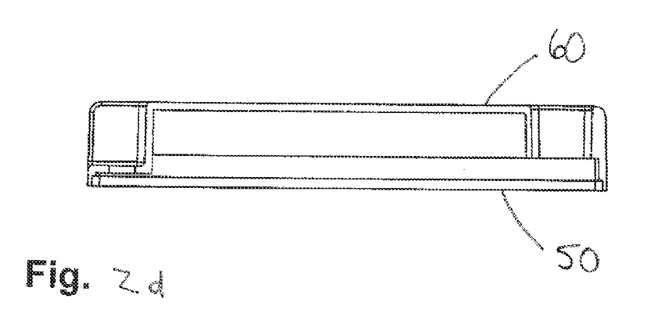

Reference is now made to FIGS. 1a and 1b, which illustrate a representative vehicle 10 for which the flasher vehicle interface module 100 may be installed. Although the vehicle 10 shown in these figures is a Dodge Charger, it should be appreciated that the flasher vehicle interface module 100 may be installed in any type of vehicle, including other sedans like the Ford Interceptor or sport utility vehicles (SUV's) like the Chevrolet Tahoe. As shown in FIGS. 1a and 1b, the vehicle may have a set of front headlights 20 and rear tail lights 30 and a rear center panel light 40. Of course, the vehicle may have other factory lights, such as parking lights, brake lights and day time running lights.

The flasher interface module 100 is designed to be isolated from (or bypass) the vehicle's CAN system and the individual body control modules (BCM's), yet still flash the factory headlights and tail lights as well as powering after-market and accessory lighting systems in multiple different flash and color patterns. Advantageously, the flasher interface module 100 may be installed in the front or rear of the vehicle for operating the headlights and tail lights, respectively, and certain modules may be inserted into either the front and/or rear of the vehicle.

Turning to FIGS. 2a-2d, the flasher interface module 100 is made of a rigid material, such as hard plastic. It includes a substantially rectangular base 50 having a printed circuit board (PCB) with a plurality of input ports and output ports. Each of the plurality of input and output ports correspond to a particular factory light of the vehicle on the driver side and the passenger side, i.e., driver side brake light or driver side high beam head light, passenger side brake light or passenger side high-beam head light. A second set of the plurality of ports correspond to a 12V DC for flash pattern selection, 12V DC for switch input, ground and control. The base 50 further includes a plurality of 12V DC relays or electromagnetic switches. The base may further includes a plurality of diodes, capacitors, metal-oxide-semiconductor field effect transistor (MOSFET) and capacitors.

The flasher interface module 100 further includes a harness including a plurality of leads or wires for each of the plurality of input and output ports. These leads may be color coded and/or labeled/numbered as well as being cut to the proper length to allow for quick and easy installation. The leads may be soldered onto the board and potted in black epoxy before the cover is installed to improve reliability and reduce the possibility of corrosion on the terminals. In another embodiment, the leads may be connected to the board by plugs on the terminal. A standard industry flasher is typically equipped with a four wire, six inch long pigtail of wires consisting of a hot, ground (GND), output and pattern select wire.

The flasher interface module 100 disclosed herein is color coded, i.e., each of the four wires is a different color, such as red, pink, orange and black (but any colors may be used). Furthermore, an additional set of wires is color coordinated with the factory lights, i.e., the driver side brake light, passenger side brake light, driver side park light and passenger side park light. Importantly, the labeled harness is already connected to the interface with each input/output braided or sleeved together and cut to the proper length. Thus, the flasher interface module is basically a "plug and play" to allow for easier installation and operation, which does not require any invasive splicing into the factory harness and Can BUS system.

A cover 60 is positioned over the base to form a housing to protect the circuit elements. The cover 60 and base 50 may connect to each other via a snap-fit locking arrangement or a fastening means may be used to connect the cover to the base. The cover 60 does not enclose the plurality of input and output ports, such that the leads from each of the plurality of ports may extend from the module 100 to an output or a factory light in the vehicle. Specifically, the cover has multiple recessed portions 70 such that the input and output ports on the base 50 of the module 100 are exposed to allow the leads to connect from them to the factory lights. Furthermore, the cover 60 has a plurality of vents 80 to all ventilation and cooling within the module. Finally, a mounting element may be positioned near one or more corners of the module 100. Each of the mounting elements may have an opening to allow a fastener, such as a screw to secure the module to the vehicle.

The module receives power directly from a 12V DC power input originating from a switch/controller that is receiving power from a front or rear power distribution port supplied by the vehicle's manufacturer at the time of assembly. Specifically, the flasher interface module 100 is powered by one positive lead from a switch in the console of the vehicle and grounded in normal fashion. As mentioned above, all of the inputs and outputs of the flasher interface module 100 operate independently of the CAN system or other BCM's in the vehicle and, thus, do not pulse or trigger these systems or modules. Importantly, the turn signals and brake lights for the vehicle operate independently of the flasher interface module 100. When the turn signals are activated by the driver of the vehicle, the flasher mode for the flasher interface is automatically turned off, so that the turn signals are visible. Similarly, when the driver applies the brakes activating the brake lights, the pattern produced by the flasher interface module 100 is automatically turned off, so that the brake lights are visible. When the turn signals are deactivated or the driver releases the brake pedal, the flasher interface module 100 would automatically reactivate the flash pattern. The turn signal has an input only because it is used to turn the flasher interface off when the turn signal is operated.

In use, the OEM headlight/taillight modules and aftermarket lighting in the front and rear of the vehicle can be operated with one flasher interface module for the front and one flasher interface module for the rear. Each flasher interface would only require one power wire and no feedback to the CAN system or individual BCM units. Indeed, the CAN system and BCM's do not even recognize that the flasher interface is connected to the vehicle. In addition, there may be an auxiliary circuit/output ports to control other non-OEM lighting. As its name suggests, the auxiliary circuit has no input since its purpose is to supply power and control after market installed equipment.

Certain of the outputs are designed to operate/flash lighting provided/installed by the OEM vehicle manufacturer. The auxiliary outputs are the channels used to control auxiliary after-market lighting installed on the vehicle, such as light bars and the like. In one embodiment, a rear flasher interface is provided for use with all rear lights of the vehicle. In another embodiment, a flasher interface labeled may be used as a universal flasher for both front and rear lights of the vehicle. Both of these interfaces operate by isolating themselves from the vehicle's primary electrical system.

Figure 3:
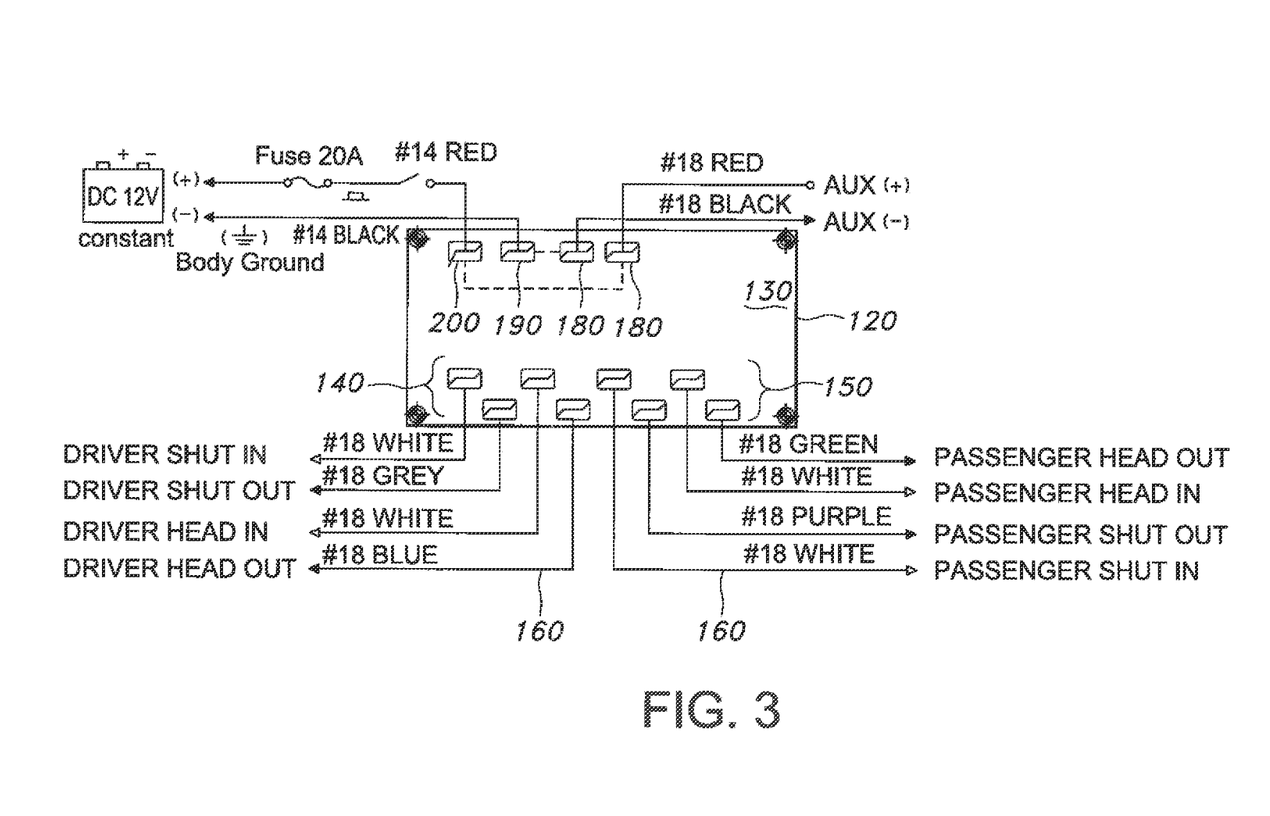
FIG. 3 is a top view of the base of a front flasher vehicle interface module forming one aspect of this disclosure.
Figure 4:
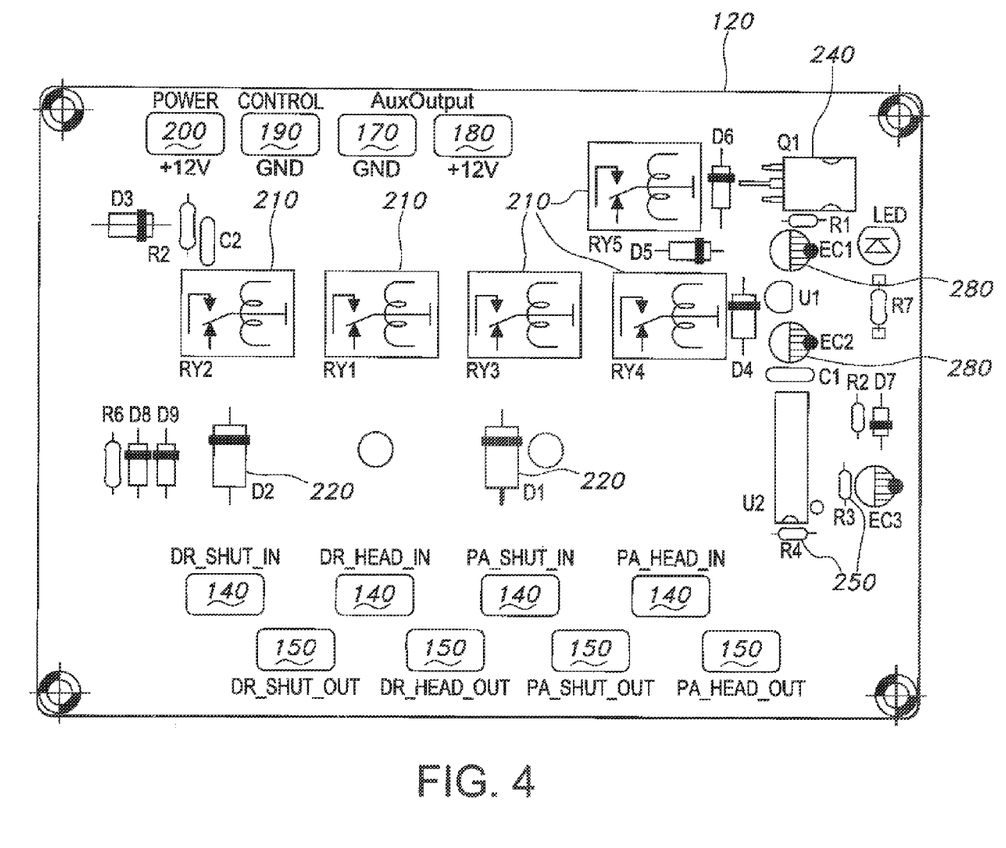
FIGS. 4 and 5 are schematic diagrams of the of a front flasher vehicle interface module forming one aspect of this disclosure.
Figure 5:
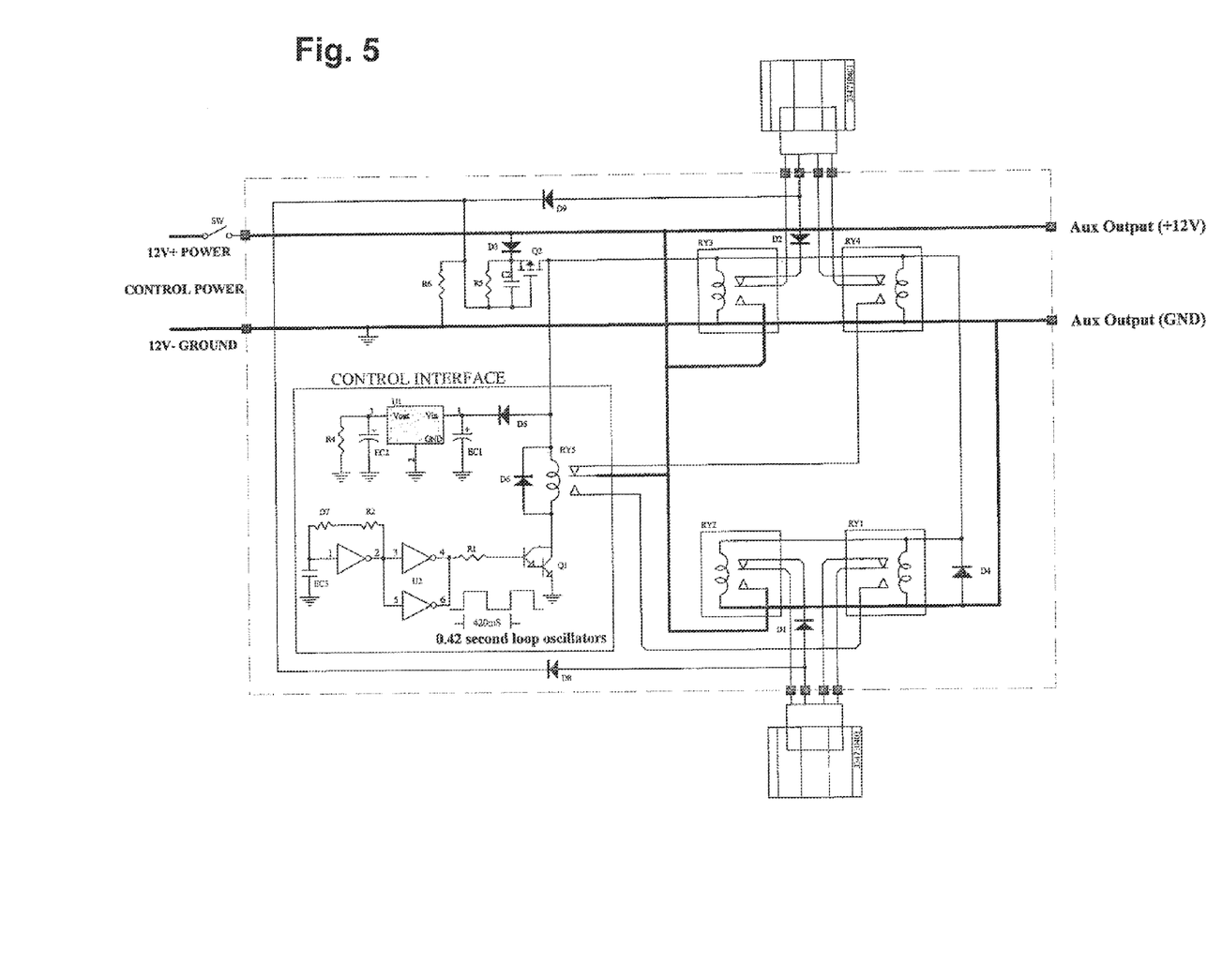

Turning to FIGS. 3-5, a front flasher interface module 120 designed to work with the vehicle's headlights is illustrated. Generally, the front flasher interface module 120 is designed for the heavier amp load of halogen headlights and has a constant 12V output circuit for powering all aftermarket/accessory lighting and various flash patterns through the module. The front flasher interface module 120 may flash the single element headlight bulbs of the vehicle while allowing the daytime running lights of the vehicle to operate normally. The module holds the headlight shutters open to allow the high beams to flash in one of at least four different patterns or randomly through each of the at least four patterns.

The front flasher interface module 120 includes a two-sided printed circuit board 130 having a plurality of plurality of input ports 140 and output ports 150 corresponding to the vehicle's headlights and shutter. As shown in FIGS. 4 and 5, there are four input ports corresponding to the driver side shutter, driver side headlights, passenger side shutter and passenger side headlights and four output ports corresponding to the driver side shutter, driver side headlights, passenger side shutter and passenger side headlights. Each of these ports has a lead 160 extending therefrom to connect to factory headlights and shutter. The front module 120 further has two auxiliary outputs corresponding to ground 170 and 12V power 180. These auxiliary outputs are used to supply power and control after market installed lighting equipment. The front module 210 further has two additional main ports corresponding to ground 190 and 12V power 200. The base of the front module 120 further includes a plurality of 12V DC relays or electromagnetic switches 210. The base further includes circuit elements, including a plurality of diodes 220, capacitors 230, transistors such as a metal-oxide-semiconductor field effect transistor (MOSFET) 240 and resistors 250.

It should be appreciated that the front flasher interface module 120 is designed to be "plug and play" that may be installed in the vehicle within minutes. Advantageously, the "plug and play" installation allows the user to plug the module directly into the factory plugs, which eliminates tedious cutting, crimping, heat shrinking, etc. of any factory wires. In order to install the front flasher interface, the headlight assembly on the passenger side of the vehicle should be located. The OEM or factory headlights should be unplugged from the headlight assembly. A female plug from the flasher interface 120 may be securely inserted into the headlight assembly. A male plug from the flasher interface 120 is securely inserted into the OEM headlight plug. These same steps are repeated and completed for the driver's side of the vehicle. The leads for the driver side are typically longer than the leads for the passenger side. Once it is plugged in, the flasher interface may be mounted on the vehicle directly or using a mounting bracket. Subsequently, the flasher interface module ground is connected to a proper body ground. A control wire is connected to the customer supplied switch for power.

An auxiliary option is provided for extra lighting requiring constant 12 DC power and ground, namely, for powering after-market lighting. If the auxiliary option is not being used, the leads should be capped or terminated. When activated, the front module 120 holds the shutter motors open in the headlights and flashes them in high beam in various patterns, such as an alternating pattern known as "wig wag." A high beam override feature is provided such that when the flasher interface module is active and the high beam setting is activated by the driver, the OEM high beam setting will override the interface module, which produces a steady stream of light on the high beam. When the high beams are switched off, the interface module will return to flashing mode after a short delay.

In another embodiment, the flasher interface module functions in the same manner as the embodiments discussed above in that it is flashing the OEM manufacturer's headlights while providing a constant 12V DC auxiliary circuit for powering all aftermarket lighting that may be installed on the front of the vehicle with zero chatter or feedback to the vehicle's CAN BUS system or BCM's. All accessory lighting is powered and grounded by the interface. However, it may additionally hold the headlight shutter motors open in high beam mode in certain models of particular vehicle manufacturers, such as the Ford Taurus and Ford Explorer Police Purpose Vehicles (PPV's). For example, certain vehicle manufacturers like Ford offer a single element headlight assembly, i.e., the shutters close over the bulb to create the low beam effect and then open in the high beam to expose the entire single element bulb.

The flasher interface opens the headlight shutters and holds them open while flashing the Ford OEM headlights in high beam for as long as the interface is activated. The interface also features high beam override that turns off the flasher whenever high beam is activated and resumes flashing mode when the high beam is deactivated. When the high beam override function is activated, the flasher deactivates and does not resume normal operation until the high beam function is deactivated to enhance officer and vehicle safety. Importantly, this interface is completely "plug and play" in that the interface contains the proper connectors to simply plug into and mate with the existing OEM harness with zero chatter or feedback into the CAN bus system or BCMs. This interface allows for flashing the OEM headlights, holding the shutters open and offering the high beam override function simultaneously allows the interface to operate in both day time and night time pursuit. The interface is easily installed in minutes as it does not require the headlights or taillights to be removed and can be transferred from vehicle to vehicle. Finally, the flasher interface may be tailored to be vehicle-specific, such as a particular make and model, i.e., a Chevrolet Tahoe.

Figure 6:
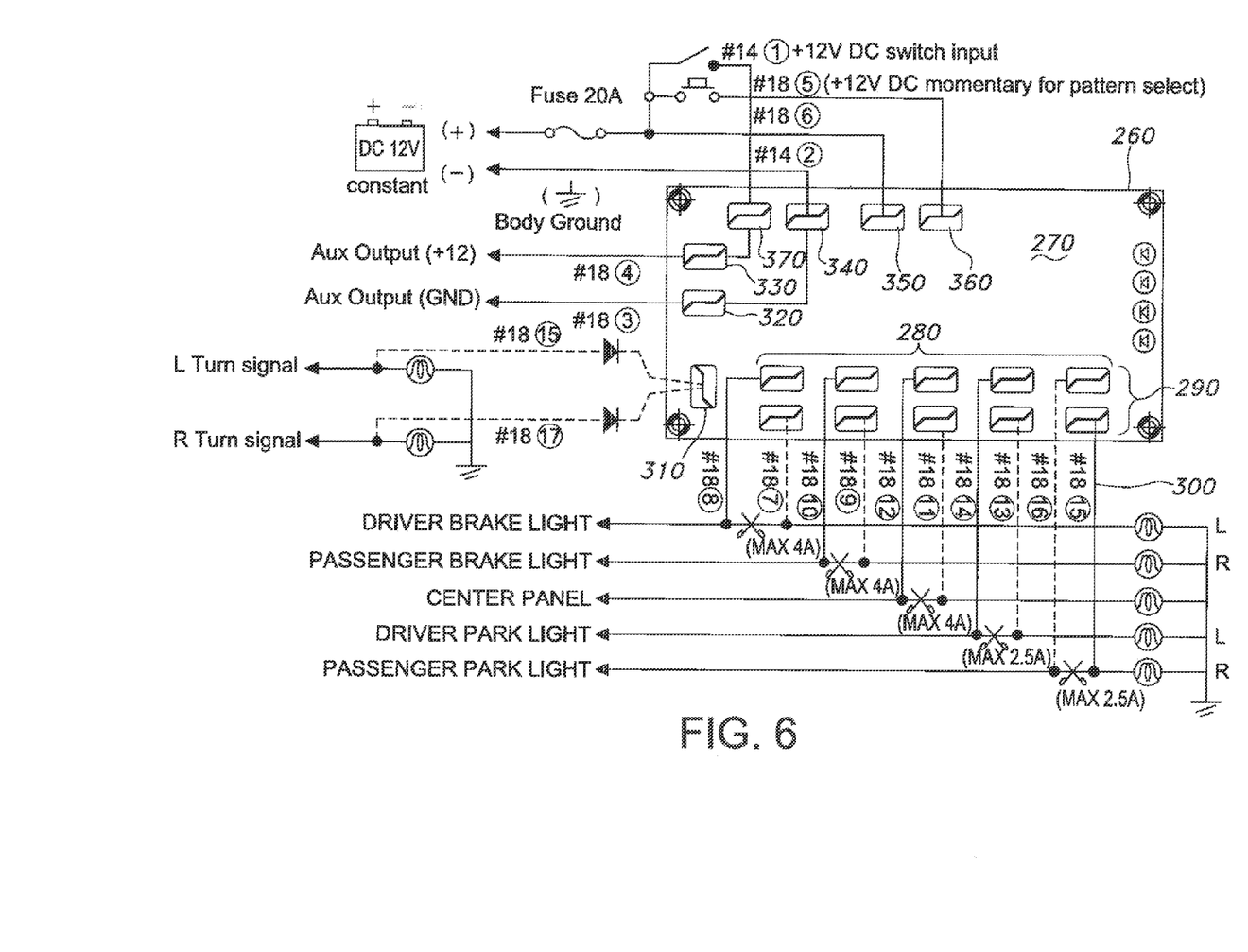
FIG. 6 is a top view of the base of a rear flasher vehicle interface module forming one aspect of this disclosure.
Figure 7:
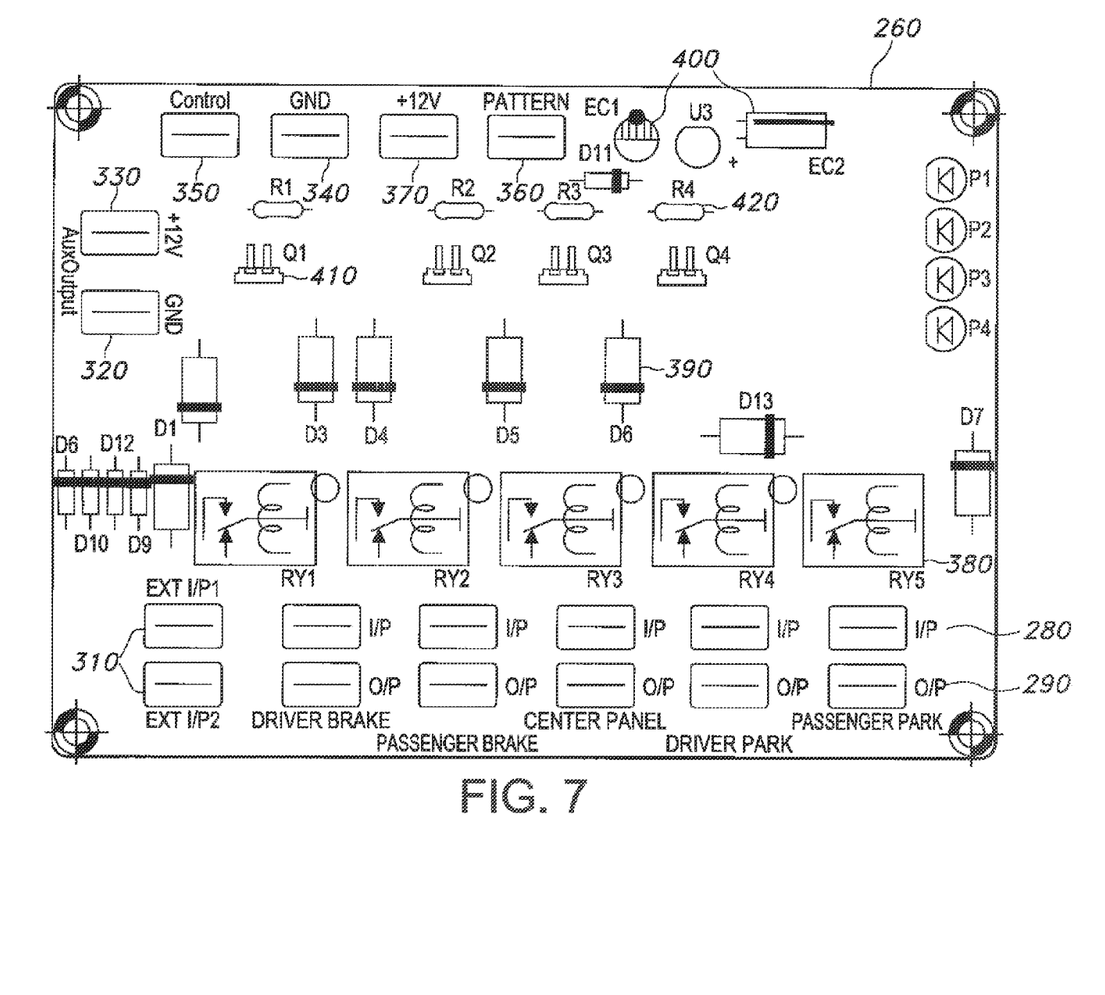
FIGS. 7 and 8A, and 8B are schematic diagrams of the of the rear flasher vehicle interface module forming one aspect of this disclosure.
Figure 8A:
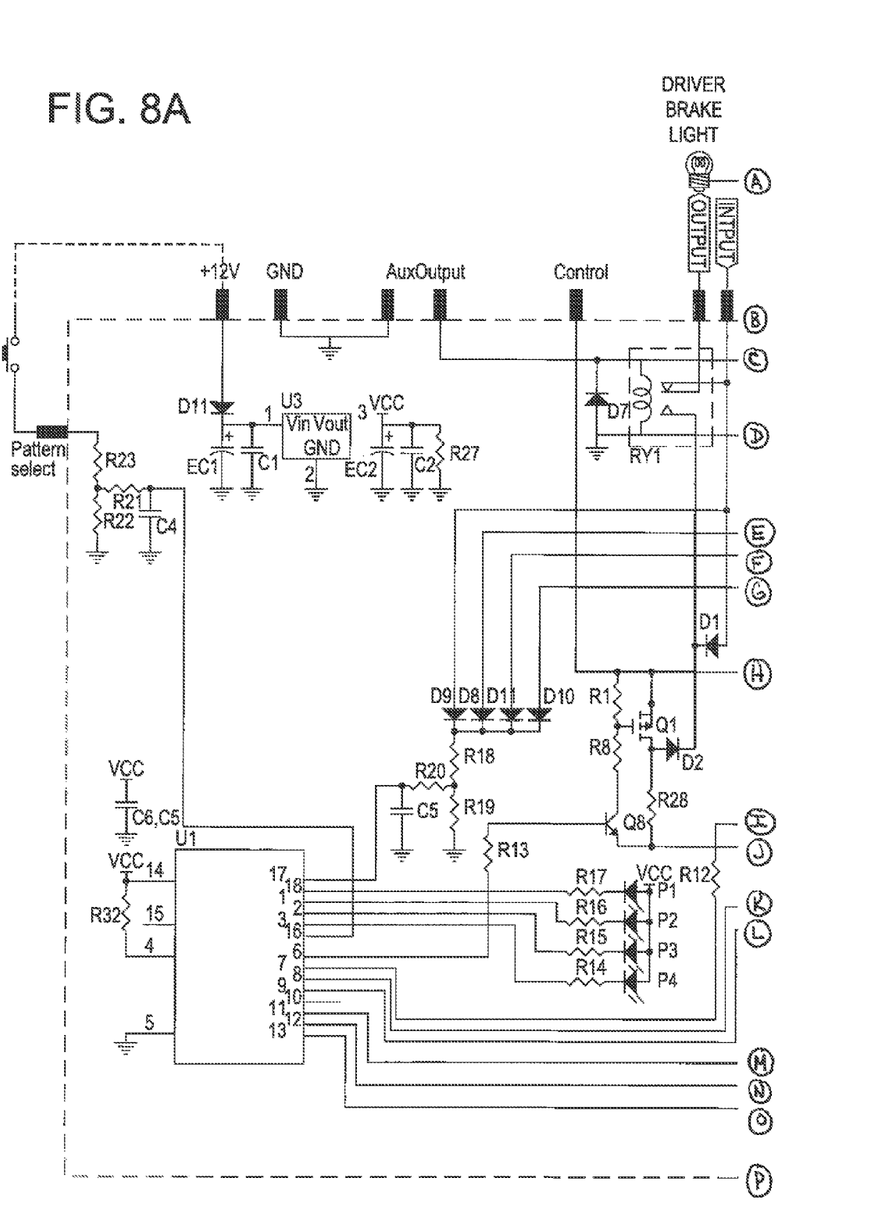
Figure 8B:
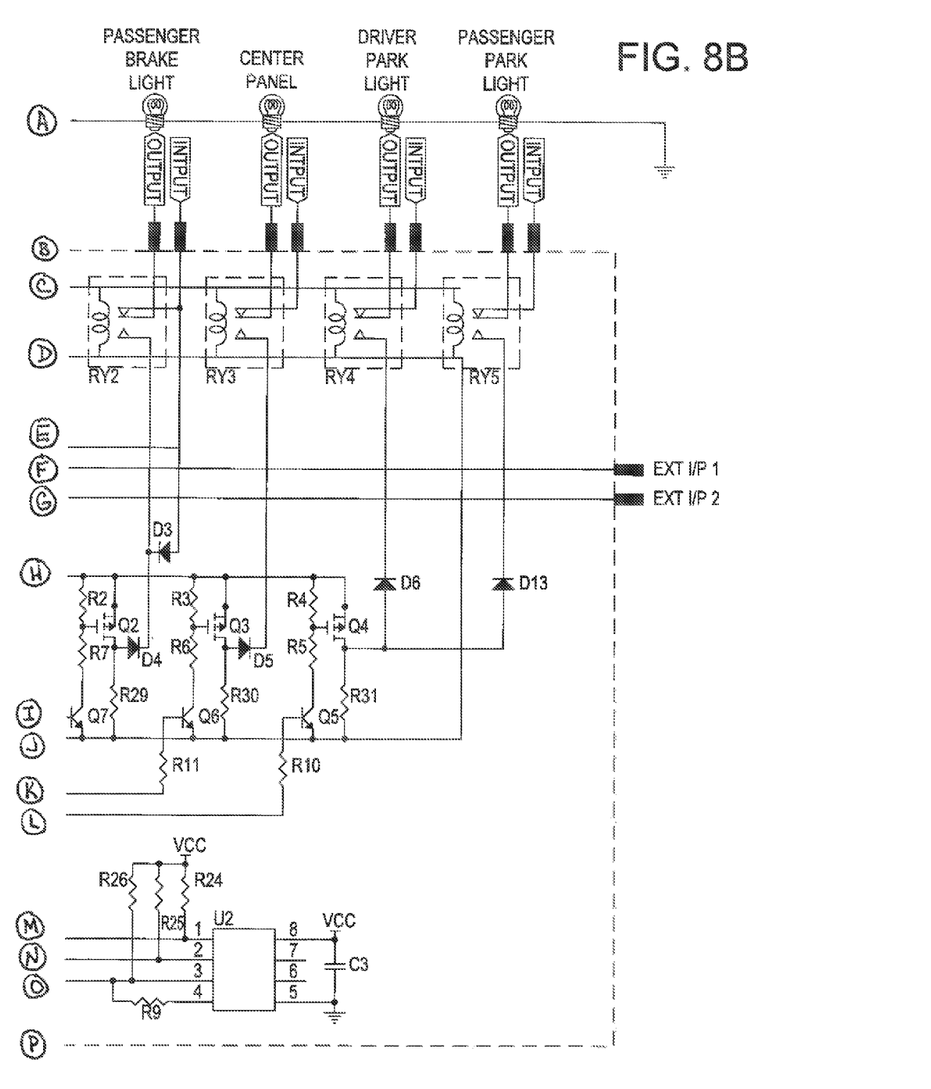

With reference to FIGS. 6-8, a rear flasher interface module 260 is illustrated that is designed to work for the rear light array (i.e., tail lights, brake lights and center panel). When activated, the rear flasher interface module 350 flashes the OEM or factory tail lights and center panel display lights. Generally, the rear flasher interface module 260 is designed for the less amp draw of the three panel LED display but may work with other vehicles rear light displays. The rear flasher interface module has a constant 12V output circuit for powering all aftermarket/accessory lighting and various flash patterns. The user or driver has at least four different selectable flash patterns to choose from when using the rear flasher interface module.

The rear flasher interface module 260 includes a two-sided printed circuit board 270 having a plurality of plurality of input ports 280 and output ports 290 corresponding to the vehicle's rear lights, including the brake lights, parking lights and center panel. As shown in FIGS. 7 and 8, there are five input ports corresponding to the driver side brake light, driver side parking lights, passenger side brake light, passenger side parking lights and the center panel. There are also five output ports corresponding to the driver side brake light, driver side parking lights, passenger side brake light, passenger side parking lights and the center panel. Each of these ports has a lead 300 extending therefrom to connect to factory rear lights. The rear module 260 further has at least one input port 310 corresponding to the left and right turn signals.

In addition, the rear flasher interface module 260 has auxiliary outputs corresponding to ground 320 and 12V D.C. power 330 for powering after-market lighting. These auxiliary outputs are used to supply power and control after market installed lighting equipment. The rear module further has four additional ports corresponding to ground 340, main power or control (+12V) 350, pattern function 360 and computer power (+12V) 370. The base of the rear module 260 further includes a plurality of 12V DC relays or electromagnetic switches 380. The base further includes circuit elements including a plurality of diodes 390, capacitors 400, transistors such as a metal-oxide-semiconductor field effect transistor (MOSFET) 410 and resistors 420.

The rear flasher interface module 260 is designed to be installed as "plug and play" such that it is used directly with the OEM connectors. In order to install the rear flasher interface module 260, the tail light assembly on the passenger side of the vehicle should be located. The OEM tail lights should be unplugged from the tail light assembly. A female plug from the flasher interface may be securely inserted into the tail light assembly. A male plug from the flasher interface is securely inserted into the OEM tail light plug. These same steps are repeated and completed for the driver's side of the vehicle. Again, the leads for the driver side are typically longer than the leads for the passenger side. The center panel assembly on the inside of the trunk lid of the vehicle is located and the OEM plug from the panel is unplugged and the female plug from the interface is securely inserted. Furthermore, the male plug from the flasher interface is securely inserted into the OEM panel plug. As should be appreciated, there are at least three inputs to plug into each tail light (driver and passenger side) and the center trunk lid panel display, which places the interface module "in line" with the Can Bus system. Furthermore, there are at least three outputs corresponding to the factory tail lights and the center trunk lid panel display. Subsequently, the flasher interface module ground is connected to a proper body ground. The flasher interface module is connected to 12V DC constant power or ignition power. A control wire is connected to the customer supplied switch.

Again, an auxiliary option is provided for extra lighting requiring constant 12 DC power and ground. If the auxiliary option is not being used, the leads should be capped or terminated. A brake light/turn signal override feature is provided such that when the flasher interface module is active and the brake lights or turn signals are activated by the driver, the OEM brake lights and/or turn signals will override the interface module, showing factory brakes and/or turn signals. When the brake lights or turn signals are switched off, the interface module will return to flashing mode after a short delay. In other words, the override feature provides an auxiliary cut off for shutting off both the factory and after market rear facing lighting when the brakes or turn signals are engaged, which allows drivers behind the emergency vehicle to know the vehicle is slowing down and/or turning.

In another embodiment, the rear flasher interface module may include two inputs for plugging into the factory tail lights for putting the interface "in line" with the Can Bus system. It further includes two outputs to plug into the interface into the factory tail light plugs. The rear flasher interface may further include a main power and ground 12 V D.C. auxiliary circuit. It is possible to override the OEM lighting through the normal circuits but also override the after-market lighting that may be installed using this auxiliary circuit. As a result, when the user activates the turn signals or brakes, all of the after-market lighting connected into the auxiliary circuit also ceases to flash.

Figure 9:
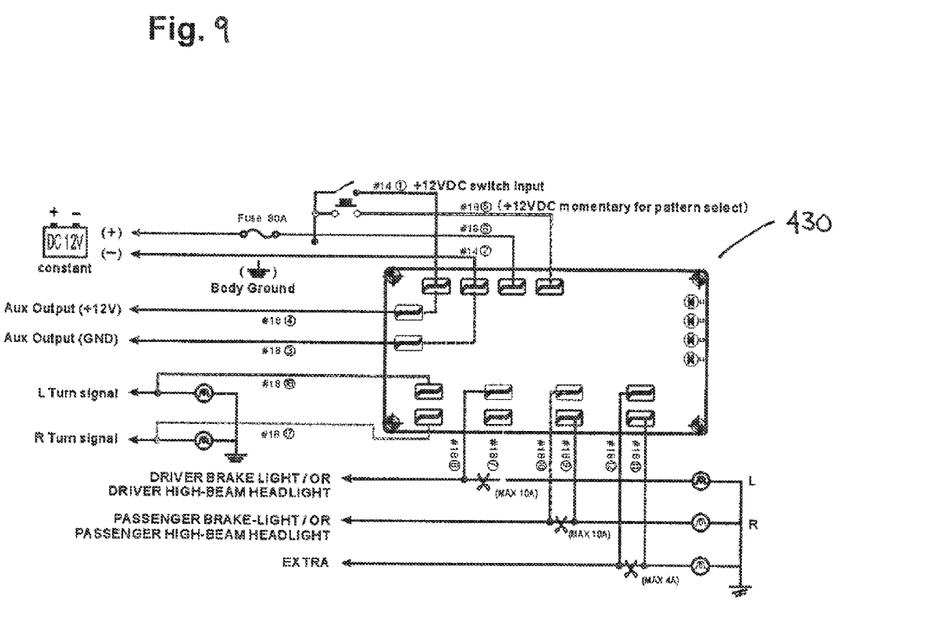
FIG. 9 is a schematic diagram of a universal flasher vehicle interface module forming one aspect of this disclosure

Turning to FIG. 9, a universal flasher interface module 430 that is designed to work for either the vehicle's headlights or the rear light array (i.e., tail lights and brake lights) is illustrated. Advantageously, this module includes two 12 AMP load heat syncs to accommodate the larger AMP load/draw for halogen headlights, incandescent bulbs or LED's that are common in the headlights including the high beam headlights, but is still capable of being used for the tail lights and the brake lights. It should be appreciated that this interface module may be hardwire installed or "plug and play" for different vehicles. It utilizes blade-type connectors to connector the harness to the circuit board for hardwire installation. Alternatively, the plurality of leads connected to the harness may be soldered to the printed circuit board (in lieu of the blade-type connectors) for improving reliability and preventing corrosion. The interface module has four outputs to hardwire into the factory harness, whether the module is installed in the front or rear of the vehicle. It further includes a main power and ground circuit.

The module 430 has a constant 12V output circuit for powering all aftermarket/accessory lighting and various flash patterns as well as powering the park or backup lights in flashing mode, i.e., "wig wag" mode. The user or driver has at least four different selectable flash patterns with this interface module. The interface module also includes the high beam override function hard wired into the front headlights such that the flash pattern is temporarily halted when the high beam setting is activated by the driver. The interface module also includes a brake light/turn signal lights override function to temporarily halt the flash pattern when the driver applies the brakes activating the brake lights or initiates a turn signal.

It should be appreciated that the flasher interface module may also incorporate input and output circuits as well as wires for the brake lights, center panel and park lights. For example, an installer may cut out a section of wire to bring the flasher interface in line with each OEM function. For example, by tapping or cutting into the driver brake light wire from the BCM, the portion of the wire cut becomes the interface input, which is then routed through relays, resistors and mosfet before become the output wire from the same circuit. The output wire from the same circuit is then connected to the driver brake light wire towards the brake light. By routing the driver brake light wire through the interface with an input and output for each circuit, the interface and its functionality is completely isolated from the CAN system and all other BCM's.

Again, as the OEM manufacturer's input is routed through the flasher interface and protected by the flasher interface, there is no feedback to the CAN system or the other BCM's. In other words, the flasher interface is "in line" and the input side operates as if nothing has changed. As a result, the instructions to flash or trigger OEM lights is occurring within the flasher interface on the output side only while the inputs are protected from feedback into the vehicle's electrical system. After the flasher interface is installed, the inputs from the BCM signals flow through the interface like it is invisible to the OEM BCM. When the flasher interface is activated, it separates the flasher interface through the use of relays and diodes from the OEM BCM and CAN system. It is capable of flashing the OEM lights with a variety of flashing patterns, including at least four different selectable flash patterns. These patterns may be changed by applying 12V positive DC voltage for 1 to 2 seconds. When the flasher interface is deactivated, the system returns to normal operation.

The foregoing descriptions of various embodiments are provided for purposes of illustration, and are not intended to be exhaustive or limiting. Modifications or variations are also possible in light of the above teachings. The embodiments described above were chosen to provide the best application to thereby enable one of ordinary skill in the art to utilize the disclosed inventions in various embodiments and with various modifications as are suited to the particular use contemplated. All such modifications and variations are within the scope of the invention.

We claim:

1. A flasher interface module for a vehicle having factory lights, comprising: four input ports corresponding to a driver side shutter, driver side headlights, passenger side shutter and passenger side headlights and four output ports corresponding to the driver side shutter, driver side headlights, passenger side shutter and passenger side headlights; two auxiliary outputs corresponding to ground and 12V power; a plurality of leads corresponding to each of the input and output ports, whereby the input and output ports of the module operate independently of the vehicle such that factory lights are controlled by the module and whereby the flasher interface module receives power directly from a 12V DC power distribution port supplied by the vehicle's manufacturer; each of the output port leads extend to connect to factory headlights and shutters; a single control wire connected to a customer supplied switch; and a control to hold shutter motors open in the headlights and flashes them in high beam in various patterns.

2. The module of claim 1, further comprising a housing.

3. The module of claim 2, wherein the housing includes a base and a cover removably connected to the base.

4. The module of claim 1, wherein said module is capable of operating the factory lights in multiple different flash patterns.

5. The module of claim 1, wherein each of the plurality of leads are a different color.

6. The module of claim 1, wherein each of the plurality of leads are labeled with a different number.

7. The module of claim 1, wherein each of the plurality of input ports corresponds equally to each of the plurality of output ports.

8. The module of claim 1, further comprising an auxiliary circuit for powering an after-market lighting system installed in the vehicle.

9. The module of claim 1, further comprising an override feature that automatically shuts off the module when a high beam light on the vehicle is activated.

10. A flasher interface module comprising a plurality of body control modules and a factory lighting system including headlights, tail lights and brake lights, the improvement comprising: an interface module that operates the factory lighting system independently of a CAN system and each of the plurality of body control modules wherein the interface module comprises an auxiliary circuit whereby the flasher interface module receives power directly from a 12V DC power distribution port supplied by the vehicle's manufacturer; four input ports corresponding to a driver side shutter, driver side headlights, passenger side shutter and passenger side headlights and four output ports corresponding to the driver side shutter, driver side headlights, passenger side shutter and passenger side headlights; two auxiliary outputs corresponding to ground and 12V power; each port has a lead extending therefrom to connect to factory headlights and shutter; and a control to hold shutter motors open in the headlights.

11. The improvement of claim 10, wherein the auxiliary circuit supplies power to an after-market light system installed on the vehicle independently of the CAN system and each of the plurality of body control modules.

12. The improvement of claim 10, wherein the interface module includes a controller for receiving power.

13. The improvement of claim 10, wherein the interface module is configured to flash the headlights in high beam mode.

14. The module of claim 1, comprising a rear flasher interface module comprising five input ports corresponding to the driver side brake light, driver side parking lights, passenger side brake light, passenger side parking lights and a center panel; five output ports corresponding to the driver side brake light, driver side parking lights, passenger side brake light, passenger side parking lights and the center panel.

* * * * *